US009612349B2

(12) United States Patent
Larsen et al.

(10) Patent No.: US 9,612,349 B2
(45) Date of Patent: Apr. 4, 2017

(54) AIRGUN OPERATING CHAMBER LINERS

(71) Applicant: WESTERNGECO L.L.C., Houston, TX (US)

(72) Inventors: Ola Pramm Larsen, Oslo (NO); Emmanuel Coste, Houston, TX (US); Michel Wolfstirn, Asker (NO)

(73) Assignee: WESTERNGECO L.L.C., Houston, TX (US)

( * ) Notice: Subject to any disclaimer, the term of this patent is extended or adjusted under 35 U.S.C. 154(b) by 202 days.

(21) Appl. No.: 14/533,384

(22) Filed: Nov. 5, 2014

(65) Prior Publication Data

US 2015/0122574 A1    May 7, 2015

Related U.S. Application Data

(60) Provisional application No. 61/900,808, filed on Nov. 6, 2013.

(51) Int. Cl.
*G01V 1/133*    (2006.01)
*G01V 1/137*    (2006.01)

(52) U.S. Cl.
CPC .................. *G01V 1/137* (2013.01)

(58) Field of Classification Search
CPC ....................................... G01V 1/137
USPC ............................. 367/15; 181/119
See application file for complete search history.

(56) References Cited

U.S. PATENT DOCUMENTS

| 4,108,272 A | 8/1978 | Paitson et al. |
| 4,219,097 A | 8/1980 | Harrison et al. |
| 4,472,794 A * | 9/1984 | Chelminski ............ G01V 1/137 181/118 |
| 4,632,214 A | 12/1986 | Bouyoucos |
| 6,388,949 B1 * | 5/2002 | Lenhardt ................ A01K 79/02 116/22 A |
| 7,321,527 B2 | 1/2008 | Hopperstad et al. |

FOREIGN PATENT DOCUMENTS

WO    2006/131745    12/2006

OTHER PUBLICATIONS

International search report and written opinion for the equivalent PCT patent application No. PCT/US2014/064196 issued on Feb. 16, 2015.

* cited by examiner

*Primary Examiner* — Daniel L Murphy

(57) ABSTRACT

Various implementations described herein are directed to a method of performing a seismic survey operation. The method may include receiving a target acoustic output for a seismic survey. The method may include selecting an operating chamber liner for an airgun to be used in a seismic survey that corresponds to the target acoustic output. The method may also include performing a seismic survey using the airgun having the selected operating chamber liner.

20 Claims, 6 Drawing Sheets

AIRGUN OPERATING CHAMBER LINERS

CROSS-REFERENCE TO RELATED APPLICATIONS

This application claims the benefit of U.S. Provisional Patent Application Ser. No. 61/900,808, filed Nov. 6, 2013, titled Modular Bandwidth Air-Gun, and the disclosure of which is incorporated herein by reference.

BACKGROUND

Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Airguns are used to generate a pressure signal for marine seismic exploration. Airguns operate by filling a chamber with compressed gas, and the compressed gas is then released to the surrounding water through one or more ports. A port is a conduit through which compressed gas escapes the chamber and enters the surrounding water, thereby creating an acoustic signal.

Airguns may emit significant acoustic amplitude outside the frequency range of interest for seismic exploration (i.e., out of bound). The out of band signal is considered noise, and may adversely affect marine life.

SUMMARY

Described herein are implementations of various technologies for a method for performing a seismic survey operation. The method may include receiving a target acoustic output for a seismic survey. The method may include selecting an operating chamber liner for an airgun to be used in a seismic survey that corresponds to the target acoustic output. The method may also include performing a seismic survey using the airgun having the selected operating chamber liner.

Described herein are also implementations of various technologies for a method for performing a seismic survey operation. The method may include receiving a target acoustic output for a seismic survey. The method may include selecting an operating chamber liner and a port for an airgun to be used in a seismic survey that corresponds to the target acoustic output. The method may also include performing a seismic survey using the airgun having the selected operating chamber liner and port.

Described herein are also implementations of various technologies for an airgun. The airgun may include a housing having an inside diameter defining a first chamber. The airgun may include a port formed through the housing in fluid communication with the first chamber. The airgun may include a shuttle flange having a diameter. The shuttle flange is moveably positioned within the first chamber during a gas-release cycle between a closed position blocking the port containing compressed gas in the first chamber to an open position exposing an exit area of the port through which the compressed gas is discharged. The airgun may also include an operating chamber liner selected to control the discharge of the compressed gas, resulting in an acoustic pulse that corresponds to a target acoustic output.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Various implementations described herein will now be described in more detail with reference to FIGS. 1-5B.

Figure 1:
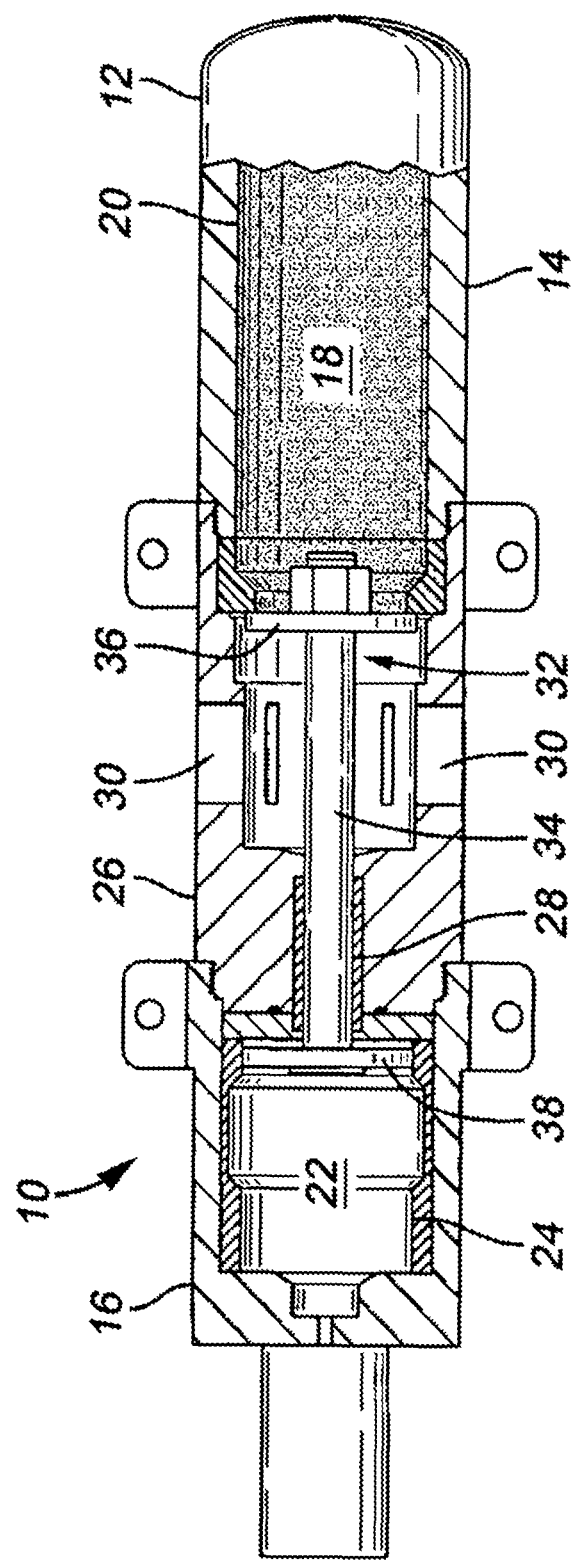
FIG. 1 is a cross section of an airgun in accordance with implementations of various techniques described herein.

FIG. 1 is a cross section of an airgun in accordance with implementations of various techniques described herein. An airgun 10 includes a housing 12 and a shuttle 32 for controlling the release of a compressed gas from the housing 12 to create an acoustic output.

Figure 3:
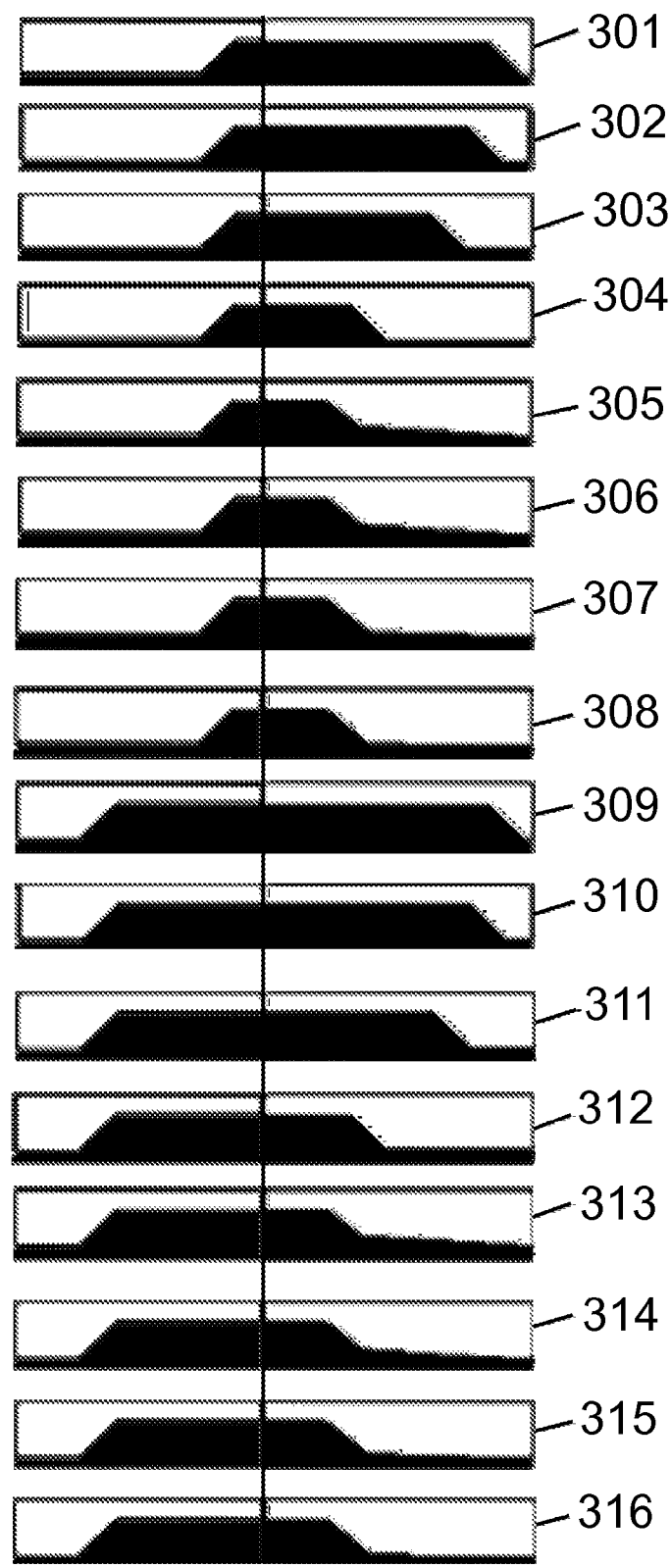
FIG. 3 is a cross sectional diagram of operating chamber liners in accordance with implementations of various techniques described herein.
Figure 4:
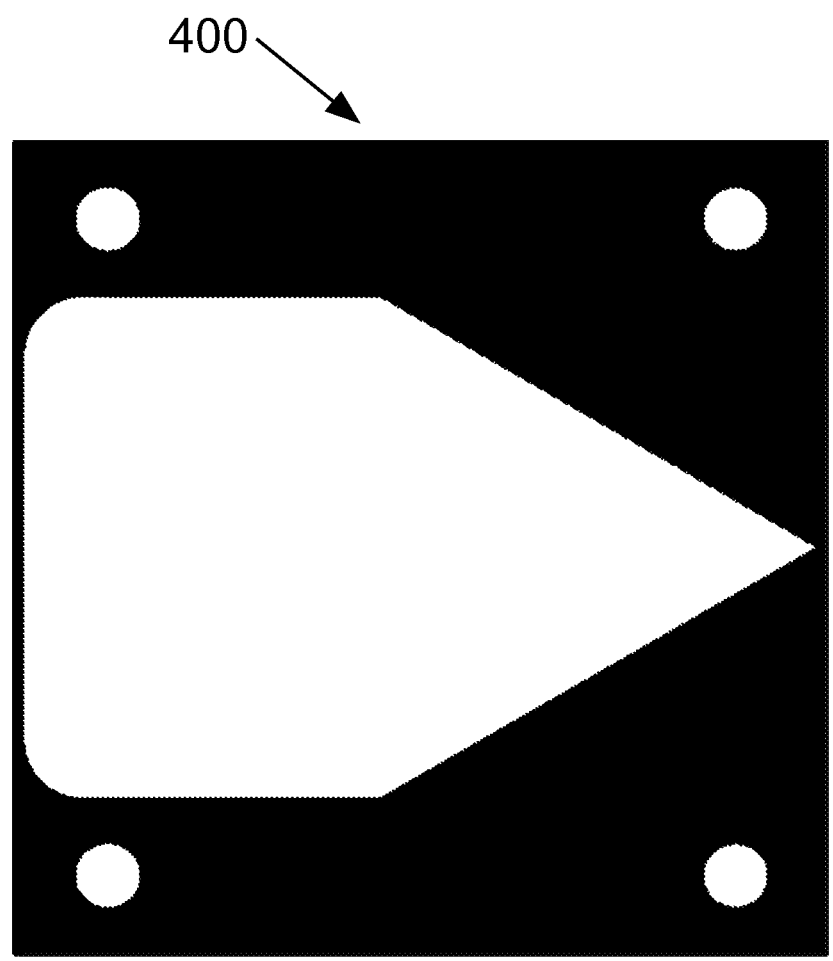
FIG. 4 illustrates a port in accordance with implementations of various techniques described herein.

The housing 12 includes a main housing section 14 and a top housing section 16. The main housing section 14 defines a fire chamber 18 having a fire chamber liner 20. The top housing section 16 defines an operating chamber 22 having an operating chamber liner 24. In one implementation, the operating chamber liner 24 may be removed and replaced with a different operating chamber liner 24. In this manner, the airgun 10 may be modular. A method of selecting and replacing an operating chamber liner is described further in FIG. 2. Examples of operating chamber liners 24 are illustrated in FIG. 3. In another implementation, the fire chamber 20 may be removed and replaced with a different fire chamber liner 20. The fire chamber 18 and the operating chamber 22 are separated by a chamber wall 26. A substantially centered bore 28 is formed through the chamber wall 26 connecting the fire chamber 18 and the operating chamber 22. One or more ports 30 are formed through main housing 14 providing fluid communication between the fire chamber 18 and the exterior of the airgun 10. An example of a port 30 is illustrated in FIG. 4. When compressed gas escapes from the airgun 10 through a port 30 and into the surrounding water, an acoustic pulse is created.

The shuttle 32 includes a shaft 34 carrying a shuttle flange 36 proximate its first end and an integral flange 38 proximate its second end. The shuttle 32 is moveably disposed in the housing 12 with the shaft 34 disposed in the centered bore 28, the shuttle flange 36 disposed in the fire chamber 18, and the integral flange 38 disposed in the operating chamber 22. When the airgun 10 is activated, high pressure air flows from the left side of the integral flange 38 to the right side. This may be referred to as equalization. As the air flows from high pressure to low pressure, the shuttle 32 moves to the left. Between shots, the shuttle 32 may reset by moving to the right.

Airguns 10 are pressure-balanced devices, the movement of the shuttle 32 is caused by the pressure differences on its opposing flanges 36 and 38. Further the movement of the shuttle 32 and the air release rate may be affected by the shape of the operating chamber liner 24. The shuttle 32, while moving during firing of the airgun 10, reveals a port 30 exit area as a function of time. The port 30 exit area is a linear function of the shuttle 32 position over the gas-release cycle. The flow exit area A(x) may be determined using the formula $A(x)=A_r(x)+A_a(x)$, where $A_r(x)$ is the port area and $A_a(x)$ is the axial flow area.

Figure 2:
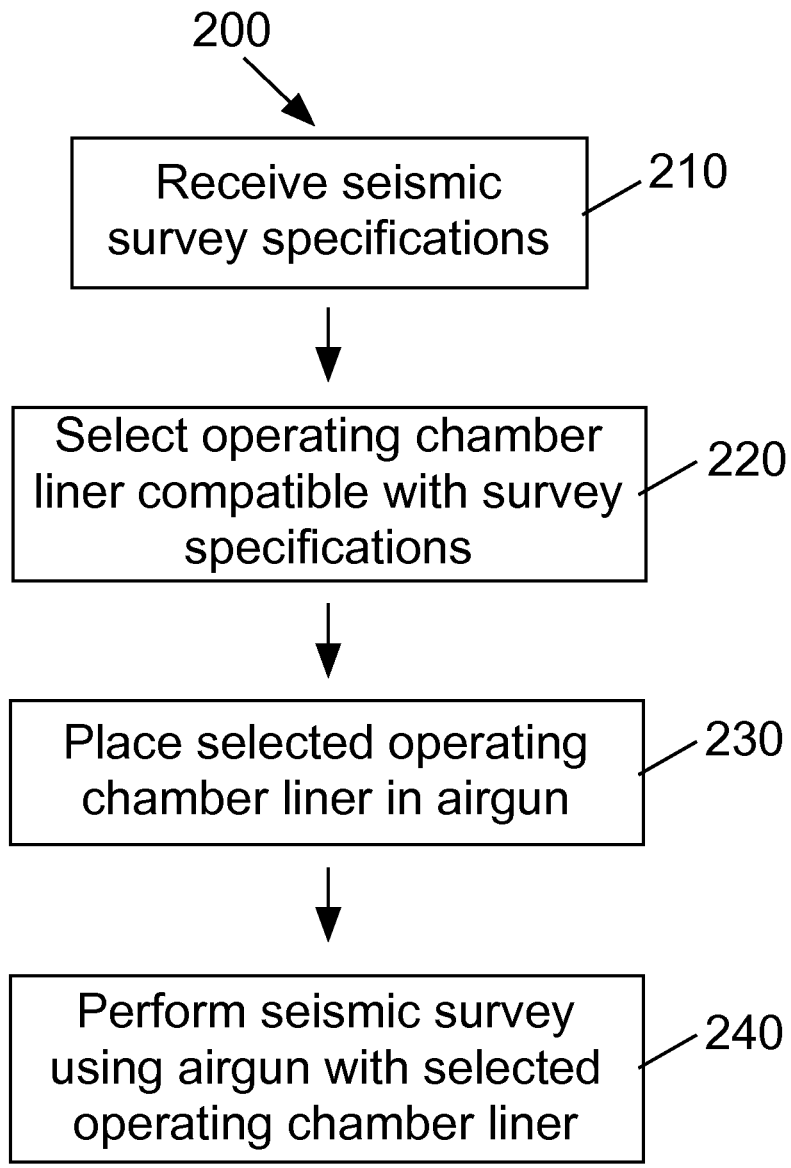
FIG. 2 is a flow diagram of a method for selecting an airgun operating chamber liner in accordance with implementations of various techniques described herein.

FIG. 2 is a flow diagram of a method 200 for selecting an airgun operating chamber liner in accordance with implementations of various techniques described herein. In one implementation, portions of method 200 may be performed by or with the assistance of a computing device. It should be understood that while method 200 indicates a particular order of execution of operations, in some implementations, certain portions of the operations might be executed in a different order. Further, in some implementations, additional operations or steps may be added to method 200. Likewise, some operations or steps may be omitted.

At block 210, seismic survey specifications may be received. The seismic survey specifications may include environmental limitations or regulations. For example, the specifications may be geophysical and environmental survey requirements. The specifications may be a target acoustic output, which may be referred to as spectral output, frequency signature and the like. For example, the specifications may detail the maximum total amplitude that may be emitted during a seismic survey, or a maximum amplitude that may be emitted above a given frequency.

Typically, in a marine seismic survey using airguns, it is desirable to have a higher amplitude at low frequencies, such as 0 to 100 Hz, because the response to those lower frequency signals is measured for seismic exploration. It is also sometimes desirable to have a lower amplitude for signals emitted at higher frequency, such as frequencies over 100 Hz. These higher frequency signals are not typically useful in seismic exploration, but they may cause environmental damage. For example, whales or other mammals may be negatively affected by high frequency seismic signals. If a seismic survey is being conducted in an area where environmental damage may occur, the specifications may limit the amplitude of high frequency seismic signals.

Figure 5A:
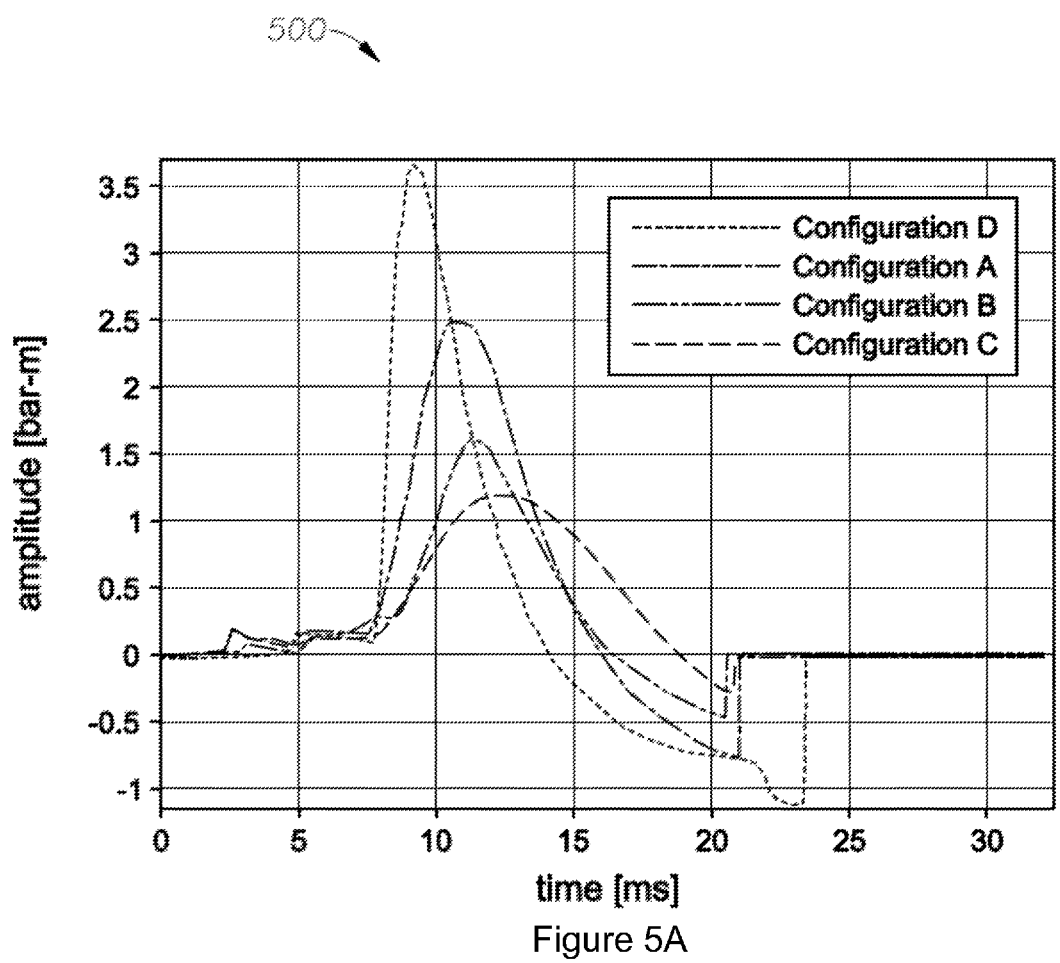
FIG. 5A illustrates a graph of airgun amplitude over time in accordance with implementations of various techniques described herein.
Figure 5B:
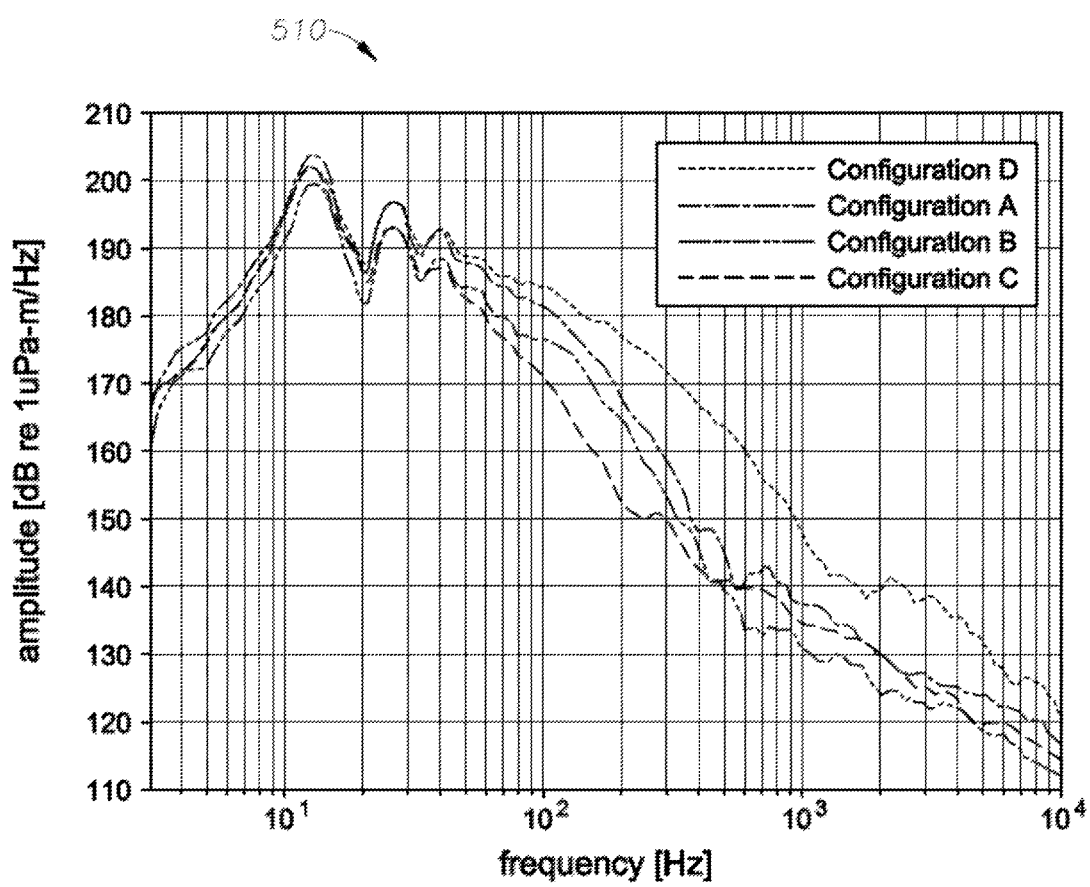
FIG. 5B illustrates a graph of airgun amplitude and frequency in accordance with implementations of various techniques described herein.

At block 220, an operating chamber liner compatible with the seismic survey specifications received at block 210 may be selected. The operating chamber liner may be selected in order to maximize the amplitude of signals emitted at desirable frequencies, and minimize the amplitude at frequencies where emitted signals may cause environmental damage. For example, if regulations limit the amplitude of signals emitted above 300 Hz, an operating chamber liner may be selected that maximizes the amplitude below 300 Hz while meeting the limitation above 300 Hz. In one implementation, if a target acoustic output is received at block 210, then at block 220 an operating chamber liner most closely matching the target acoustic output may be selected. For example, a time-amplitude graph as illustrated in FIG. 5A or an amplitude-frequency graph as illustrated in FIG. 5B may be used to determine which operating chamber liner best matches seismic survey specifications. In another implementation, an operating chamber liner may be designed in order to match the received seismic survey specifications.

At block 230, the operating chamber liner selected at block 220 may be placed in an airgun. The airgun may be specifically designed in such a way that the operating chamber liner may be removed and replaced. In one implementation, the port on the airgun may be replaced as well.

At block 240, a seismic survey may be performed using one or more airguns with the operating chamber liner selected at block 220. In one implementation a signature de-convolution operator may be used during the seismic survey or when processing seismic survey data in order to reduce the effects of noise caused by a bubble train produced by the airgun. In a second implementation, high-cut filters with varying corner frequency may be used in order to decrease the amplitude of high frequency signals emitted during the seismic survey.

In certain instances, the method 200 described in FIG. 2 may be performed by replacing a fire chamber liner, or by replacing a fire chamber liner and an operating chamber liner. For example, instead of selecting an operating chamber liner at block 220 and placing the operating chamber liner in an airgun at block 230, a fire chamber liner compatible with survey specifications may be selected at block 220 and the fire chamber liner may be placed in an airgun at block 230.

FIG. 3 is a cross sectional diagram of operating chamber liners in accordance with implementations of various techniques described herein. FIG. 3 illustrates a cross section of various operating chamber liners 301-16 that may be used in an airgun. The black portion of the operating chamber liners illustrates a groove. The groove is an empty area within the operating chamber liner. When an airgun is activated, the shuttle may travel from right to left in the groove of the operating chamber liner. If a groove is larger, airflow over the shuttle's flange may be increased, which may result in an increased speed of the shuttle's travel from right to left. The speed at which air flows over the shuttle may be known as an "equalization rate." A larger groove may result in a larger total amplitude of emitted signals or a larger amplitude of high frequency signals.

The operating chamber liners 301-16 are illustrated with a dividing line through approximately the center of each liner. The dividing line is for illustrative purposes only, it is not actually a part of an operating chamber liner. The portion of the groove to the right of the dividing line affects the speed at which the shuttle will travel from right to left. The portion of the groove to the left of the dividing line also has an effect on the speed at which the shuttle travels, but the effect may be less than that of the portion to the right. The amount of air remaining in the firing chamber after a shot may be affected primarily by the portion of the groove to the left of the dividing line. A larger groove to the left of the dividing line may lead to a slower shuttle return time, thus allowing a greater total amount of gas to escape the firing chamber.

FIG. 4 illustrates a port 400 in accordance with implementations of various techniques described herein. The port 400 may be used in combination with any of the operating chamber liners 301-16 in order to perform a seismic survey using an airgun. Alternative ports or operating chamber liners may also be used.

FIG. 5A illustrates a graph of airgun amplitude over time in accordance with implementations of various techniques described herein. FIG. 5B illustrates a graph of airgun amplitude and frequency in accordance with implementations of various techniques described herein.

Both FIG. 5A and FIG. 5B illustrate the amplitude of airgun configurations A-D. Graph 500 illustrates the amplitude of signals emitted over time. Graph 510 illustrates the amplitude of signals emitted at each frequency. The different configurations correspond to different operating chamber liners. Cross sections of the operating liners are illustrated in FIG. 3. Configuration A corresponds to operating chamber liner 309. Configuration B corresponds to operating chamber liner 314. Configuration C corresponds to operating chamber liner 315. Configuration D corresponds to operating chamber liner 301. As can be seen in graph 510, the amplitude of Configurations A-D may be fairly similar at low frequencies, such as 0-100 Hz, but may vary dramatically at higher frequencies. For example, at around 300 Hz, Configuration D has an amplitude of approximately 170 dB rel 1 uPa-m/Hz, whereas Configuration C has a lower amplitude of approximately 150 dB rel 1 uPa-m/Hz. If mammals are in the area of a seismic survey, and the mammals are sensitive to signals emitted at 300 Hz, then Configuration C would be less harmful to the mammals than Configuration D. In this instance, an airgun having an operating chamber line having Configuration C would be used to conduct the seismic survey to avoid injuring the mammals in the area.

The detailed description is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

Reference will now be made in detail to various implementations, examples of which are illustrated in the accompanying drawings and figures. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing a seismic survey, comprising:
   providing an airgun, wherein the airgun includes an initial operating chamber liner configured to generate an initial acoustic output for the seismic survey, wherein the target acoustic output is different from the initial acoustic output;
   receiving a target acoustic output for the seismic survey;

selecting an operating chamber liner for the airgun to be used in the seismic survey that corresponds to the target acoustic output;

replacing the initial operating chamber liner with the selected operating chamber liner in the airgun in order to generate the target acoustic output; and performing the seismic survey using the airgun having the selected operating chamber liner.

2. The method of claim 1, wherein the target acoustic output is a frequency signature.

3. The method of claim 1, wherein the selected operating chamber liner has a cross sectional profile that would cause the airgun to generate the target acoustic output.

4. The method of claim 1, wherein the target acoustic output comprises a maximum total amplitude.

5. The method of claim 1, wherein the target acoustic output comprises a maximum amplitude above a predetermined frequency.

6. The method of claim 1, wherein the target acoustic output comprises a maximum amplitude for signals emitted above 100 Hz.

7. The method of claim 1, wherein the target acoustic output comprises a maximum amplitude of about 180 dB rel 1 uPa-m/Hz for signals emitted above 100 Hz.

8. The method of claim 1, wherein selecting the operating chamber liner that corresponds to the target acoustic output comprises selecting the operating chamber liner from a plurality of operating chamber liners, wherein the selected operating chamber liner is configured to cause the airgun to emit signals with the greatest amplitude without exceeding the target acoustic output.

9. The method of claim 1, wherein the selected operating chamber liner is a cylinder having a groove configured to allow a shuttle to move within the operating chamber such that the airgun would generate the target acoustic output.

10. The method of claim 1, wherein selecting an operating chamber liner comprises:

receiving a set of operating chamber liners;

removing operating chamber liners from the set that exceed the target acoustic output; and selecting an operating chamber liner from the set of operating chamber liners, where the selected operating chamber liner has the largest groove of any operating chamber liner in the remaining set of operating chamber liners.

11. A method for performing a seismic survey, comprising:

providing an airgun, wherein the airgun includes an initial operating chamber liner and an initial port configured to generate an initial acoustic output for the seismic survey;

receiving a target acoustic output for the seismic survey, wherein the target acoustic output is different from the initial acoustic output;

selecting an operating chamber liner and a port for the airgun to be used in the seismic survey that correspond to the target acoustic output;

replacing the initial operating chamber liner and the initial port with the selected operating chamber liner and the selected port in the airgun in order to generate the target acoustic output; and performing the seismic survey using the airgun having the selected operating chamber liner and selected port.

12. The method of claim 11, wherein the target acoustic output comprises a maximum amplitude above a predetermined frequency.

13. The method of claim 11, wherein the target acoustic output comprises a maximum amplitude for signals emitted above 100 Hz.

14. The method of claim 11, wherein the target acoustic output comprises a maximum amplitude of about 180 dB rel 1 uPa-m/Hz for signals emitted above 100 Hz.

15. The method of claim 11, wherein selecting the operating chamber liner and the port that correspond to the target acoustic output comprises selecting the operating chamber liner and the port that cause the airgun to emit signals with the greatest amplitude without exceeding the target acoustic output.

16. An airgun, comprising:

a housing having an inside diameter defining a first chamber;

a port formed through the housing in fluid communication with the first chamber;

a shuttle flange having a diameter, wherein the shuttle flange is moveably positioned within the first chamber during a gas-release cycle between a closed position blocking the port containing compressed gas in the first chamber to an open position exposing an exit area of the port through which the compressed gas is discharged; and an operating chamber liner selected to control the discharge of the compressed gas, wherein the selected operating chamber liner is configured to replace an initial operating chamber liner in order to generate an acoustic pulse that corresponds to a target acoustic output, wherein the target acoustic output is different from an initial acoustic output generated using the initial operating chamber liner.

17. The airgun of claim 16, wherein the selected operating chamber liner is selected to maximize the speed of the shuttle flange without causing the acoustic pulse to exceed the target acoustic output.

18. The airgun of claim 16, wherein the target acoustic output comprises a maximum amplitude for signals emitted above 100 Hz.

19. The airgun of claim 16, wherein the target acoustic output comprises a maximum amplitude of about 180 dB rel 1 uPa-m/Hz for signals emitted above 100 Hz.

20. The airgun of claim 16, wherein the selected operating chamber liner and the port are replaceable.

* * * * *